June 13, 1961
N. MOSS ET AL
MECHANICAL GOVERNORS
Filed July 23, 1959
2,987,926
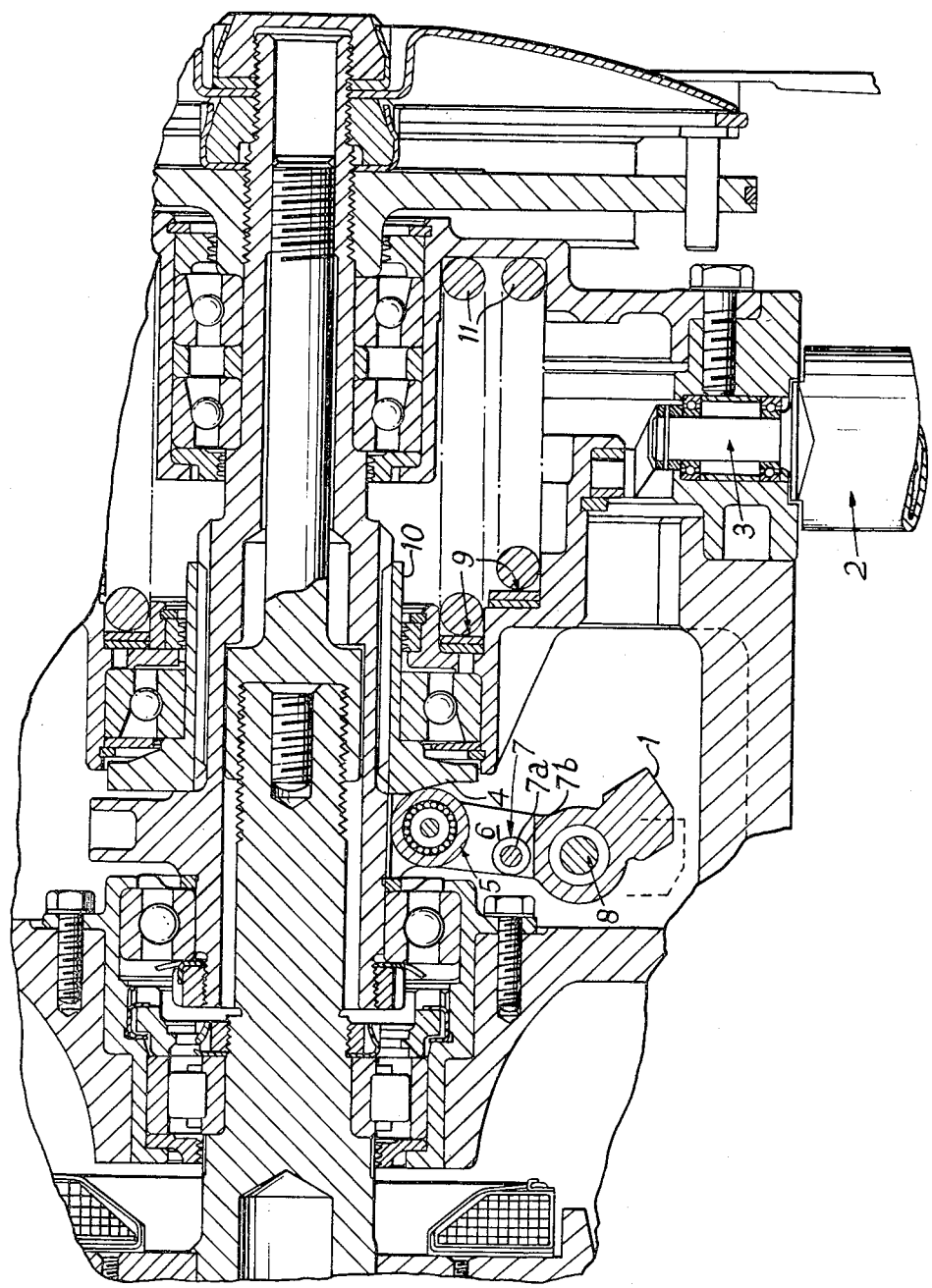

2,987,926
MECHANICAL GOVERNORS
Norman Moss, London, and Geoffrey John Deverill, Chigwell, England, assignors to The Plessey Company Limited, London, England, a British company
Filed July 23, 1959, Ser. No. 829,153
2 Claims. (Cl. 73—534)

This invention relates to mechanical governors and has for an object to provide improved mechanical governors having desirable response characteristics.

According to the invention a governor bush is moved axially of a rotating shaft against a spring or other resilient load by cam engagement between suitable surfaces respectively provided on the bush and on an arm or arms each connected to a governor weight.

Preferably each governor weight is pivoted for movement about an axis that is fixed relative to the shaft and extends tangentially to its path of rotation, and an arm connected to each governor weight co-operates, for example, through a roller, with an annular cam face on the bush.

The decrease in the effectivity of the centrifugal force due to the approach of each governor weight to the plane of rotation of this pivot axis may be compensated by the provision of an auxiliary weight which at zero-speed position has its centre of gravity in the said plane of rotation, radially inwardly of the pivot axis, so that the effectivity of the centrifugal force acting on the auxiliary weight increases as the effectivity of the centrifugal force acting on the main governor weight decreases.

The invention is illustrated in the drawing accompanying the specification, which shows a cross-sectional view of one mechanical governor according to the invention, incorporated in a ram-air turbine. Movement of the governor weights 1 displaces a governor bush 10 along its axis against the action of a spring 11 and thereby causes inlet guide vanes 2 of the turbine to swing about their pivots 3 thus varying the power of the turbine in such manner according to the demands of load and of the wind speed, as to produce a substantially constant speed of rotation.

It is desirable that the force derived from the governor weights 1, as they take up different positions during the governing process, should increase, during outward movement of the weights, in substantially the same way in which the force of the governor spring 11 increases as the spring is compressed.

For reasons of geometry the variation of the torque produced by each weight 1 is not, however, such a simple relationship of its displacement. For this reason, according to a feature of the present invention, a roller 5 carried on an arm 6 rigidly connected with each weight 1 is arranged to act on an annular cam face 4 provided on the bush 10. By suitable choice of the cam shape, it is possible to obtain the desired linear or near-linear relationship between the movement of the governor weight from its zero-speed position and the compression of the spring 11.

From purely practical considerations it has been found advantageous to trim the rate of force from the governor weights so as to match the spring. This is achieved by the provision of a counterbalance weight 7 which is so arranged that at zero speed it is positioned in a radial line passing through the pivot axis 8 of the weight 1 at a point between the pivot axis 8 and the axis about which the governor rotates. Being thus positioned, the counterbalance weight 7 will add nothing to the effect of the governor weight 1 at zero speed, when the governor weight is in its innermost position, but the influence of counterbalance weight 7 will be felt as movement takes place, and will become greater with increasing speed of movement. In effect the provision of the counterbalance weight 7 increases the rate of increase of the thrust produced by the governor weight whilst the initial thrust (in the inner-most position) remains unaltered.

The counterbalance weight 7 as shown in the drawing consists of a pin 7a upon which a number of weights in the form of washers 7b are threaded. The masses of the individual washers may be different from each other to give a greater choice of aggregate weight, a suitable selection of weights being made according to test observations.

What we claim is:

1. A mechanical governor, comprising a rotatable governor shaft, a bush encircling said shaft and mounted for movement axially of said shaft, said bush having an axially facing radially curved annular cam surface, a spring urging the bush in the direction of the cam face, at least two arms pivoted to the shaft for movement about axes that are spaced radially from the axis of the shaft and extend tangentially to a circle coaxial with said shaft, each said arm being equipped with a governor weight having a centre of gravity spaced in one direction from the pivot axis of the arm and each said arm having a surface spaced from said pivot axis in another direction and engaging said cam surface of the bush for controlling, in co-operation with the spring, the axial position of the bush in accordance with the speed of rotation of the shaft, each arm being further provided with an auxiliary weight so located on the arm that at zero speed of the shaft the centre of gravity of the auxiliary weight is located between the axis of the shaft and the pivot axis of the arm and in the plane of rotation of said pivot axis.

2. A governor as claimed in claim 1, wherein at least part of each said auxiliary weight is detachably mounted on the arm to permit variation of the mass of the auxiliary weight.

References Cited in the file of this patent

UNITED STATES PATENTS

| | | |
|---|---|---|
| 443,064 | Barrett et al. | Dec. 16, 1890 |
| 512,411 | Thompson | Jan. 9, 1894 |
| 559,054 | Dennis | Apr. 28, 1896 |
| 2,230,736 | Warner | Feb. 4, 1941 |
| 2,464,853 | DeMarco | Mar. 22, 1949 |

FOREIGN PATENTS

| | | |
|---|---|---|
| 215,630 | Australia | June 10, 1958 |
| 2,227 | Great Britain | Mar. 14, 1896 |